United States Patent
Chintala et al.

(10) Patent No.: US 11,645,049 B2
(45) Date of Patent: May 9, 2023

(54) AUTOMATED SOFTWARE APPLICATION GENERATION

(71) Applicant: INTERNATIONAL BUSINESS MACHINES CORPORATION, Armonk, NY (US)

(72) Inventors: Manohar Chintala, Cary, NC (US); Swarnalata Patel, Morrisville, NC (US); Rama Prasad Reddy Munagala, Cary, NC (US); Pranshu Tiwari, Delhi (IN); Harish Bharti, Pune (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/301,727

(22) Filed: Apr. 13, 2021

(65) Prior Publication Data

US 2022/0326917 A1 Oct. 13, 2022

(51) Int. Cl.
*G06F 8/35* (2018.01)
*G06N 20/00* (2019.01)
*G06N 7/01* (2023.01)

(52) U.S. Cl.
CPC ............... *G06F 8/35* (2013.01); *G06N 7/01* (2023.01); *G06N 20/00* (2019.01)

(58) Field of Classification Search
CPC ............ G06F 8/35; G06N 20/00; G06N 7/01
See application file for complete search history.

(56) References Cited

U.S. PATENT DOCUMENTS

| 9,015,144 | B2 | 4/2015 | Sun | |
|---|---|---|---|---|
| 9,330,179 | B2 | 5/2016 | Sun | |
| 9,465,726 | B2 | 10/2016 | Kozhuharov | |
| 9,946,637 | B2 | 4/2018 | Zhang | |
| 11,544,048 | B1* | 1/2023 | Ravindran | G06F 8/60 |
| 2014/0136211 | A1* | 5/2014 | Chou | G10L 15/22 704/275 |

(Continued)

OTHER PUBLICATIONS

AI Prime; https://www.dellemc.com/content/dam/uwaem/production-design-assets/india/Downloadables_3-AI-transforming-DevOps.pdf; retrieved from the Internet Jan. 18, 2021; 4 pages.

(Continued)

*Primary Examiner* — Ziaul A Chowdhury
(74) *Attorney, Agent, or Firm* — Schmeiser, Olsen & Watts LLP; Christopher Pignato

(57) ABSTRACT

A method, system, and computer program product for implementing automated software application generation is provided. The method includes scanning source code for identifying missing elements of hardware and software parameters associated with functional operation of software for development. The hardware and software parameters are analyzed and converted into configurable digital bins. An automation parameter is generated. The automation parameter is associated with portions of the software configured for automatic development and generation. Corrective actions associated with automating development of the software are generated based on the automation parameter and it is determined that the automation parameter is within a specified range of the portions. The corrective actions are executed with respect to development of the software and the software is generated.

20 Claims, 7 Drawing Sheets

(56) References Cited

U.S. PATENT DOCUMENTS

2019/0042400 A1      2/2019  Surace
2021/0089360 A1*    3/2021  Wong .................... G06F 9/5016
2022/0318057 A1*   10/2022  Hebbalalu ................ G06F 9/50

OTHER PUBLICATIONS

Build Stronger Code with the Fastest Developer Testing Tool; https://smartbear.com/product/testleft/overview/; retrieved from the Internet Jan. 18, 2021; 5 pages.
Continuous Testing; https://www.suneratech.com/quality-engineering/digital-assurance/continuous-testing%E2%80%8B/; Jan. 18, 2021; 9 pages.
Srinivas, Hariprasad; All About XPath and UI Element Identification Using XPath Selectors; https://blog.testproject.io/2019/11/18/xpath-and-ui-element-identification-using-xpath-selectors/; Nov. 18, 2019; 16 pages.
Mell, Peter et al.; "The NIST Definition of Cloud Computing;" National Institute of Standards and Technology; Special Publication 800-145; Sep. 2011; 7 pages.

* cited by examiner

AUTOMATED SOFTWARE APPLICATION GENERATION

BACKGROUND

The present invention relates generally to a method for automatically generating automation quotient software and in particular to a method and associated system for improving software technology associated with scanning source code for identifying missing hardware and software parameters, determining an associated automation parameter for automated software generation, and executing corrective actions for generating associated software.

SUMMARY

A first aspect of the invention provides an automated software application generation method comprising: scanning, by a processor of a hardware device, source code; identifying, by the processor in response to results of the scanning, missing elements of hardware and software parameters associated with functional operation of software for development; analyzing, by the processor, the hardware and software parameters; converting, by the processor, the hardware and software parameters into a plurality of configurable digital bins; determining, by the processor in response to results of the analyzing, an automation parameter associated with portions of the software configured for automatic development and generation; generating, by the processor based on results of the converting with respect to the automation parameter, corrective actions associated with automating development of the software; additionally determining, by the processor, that the automation parameter is within a specified range of the portions; executing, by the processor in response to results of the additionally determining, the corrective actions with respect to the development of the software; and automatically generating, by the processor in response to the executing, the software.

A second aspect of the invention provides a computer program product, comprising a computer readable hardware storage device storing a computer readable program code, the computer readable program code comprising an algorithm that when executed by a processor of a hardware device implements an automated software application generation method, the method comprising: scanning, by the processor, source code; identifying, by the processor in response to results of the scanning, missing elements of hardware and software parameters associated with functional operation of software for development; analyzing, by the processor, the hardware and software parameters; converting, by the processor, the hardware and software parameters into a plurality of configurable digital bins; determining, by the processor in response to results of the analyzing, an automation parameter associated with portions of the software configured for automatic development and generation; generating, by the processor based on results of the converting with respect to the automation parameter, corrective actions associated with automating development of the software; additionally determining, by the processor, that the automation parameter is within a specified range of the portions; executing, by the processor in response to results of the additionally determining, the corrective actions with respect to the development of the software; and automatically generating, by the processor in response to the executing, the software.

A third aspect of the invention provides a server hardware device comprising a processor coupled to a computer-readable memory unit, the memory unit comprising instructions that when executed by the processor implements an automated software application generation method comprising: scanning, by the processor, source code; identifying, by the processor in response to results of the scanning, missing elements of hardware and software parameters associated with functional operation of software for development; analyzing, by the processor, the hardware and software parameters; converting, by the processor, the hardware and software parameters into a plurality of configurable digital bins; determining, by the processor in response to results of the analyzing, an automation parameter associated with portions of the software configured for automatic development and generation; generating, by the processor based on results of the converting with respect to the automation parameter, corrective actions associated with automating development of the software; additionally determining, by the processor, that the automation parameter is within a specified range of the portions; executing, by the processor in response to results of the additionally determining, the corrective actions with respect to the development of the software; and automatically generating, by the processor in response to the executing, the software.

The present invention advantageously provides a simple method and associated system capable of automatically generating software code.

DETAILED DESCRIPTION

Figure 1:
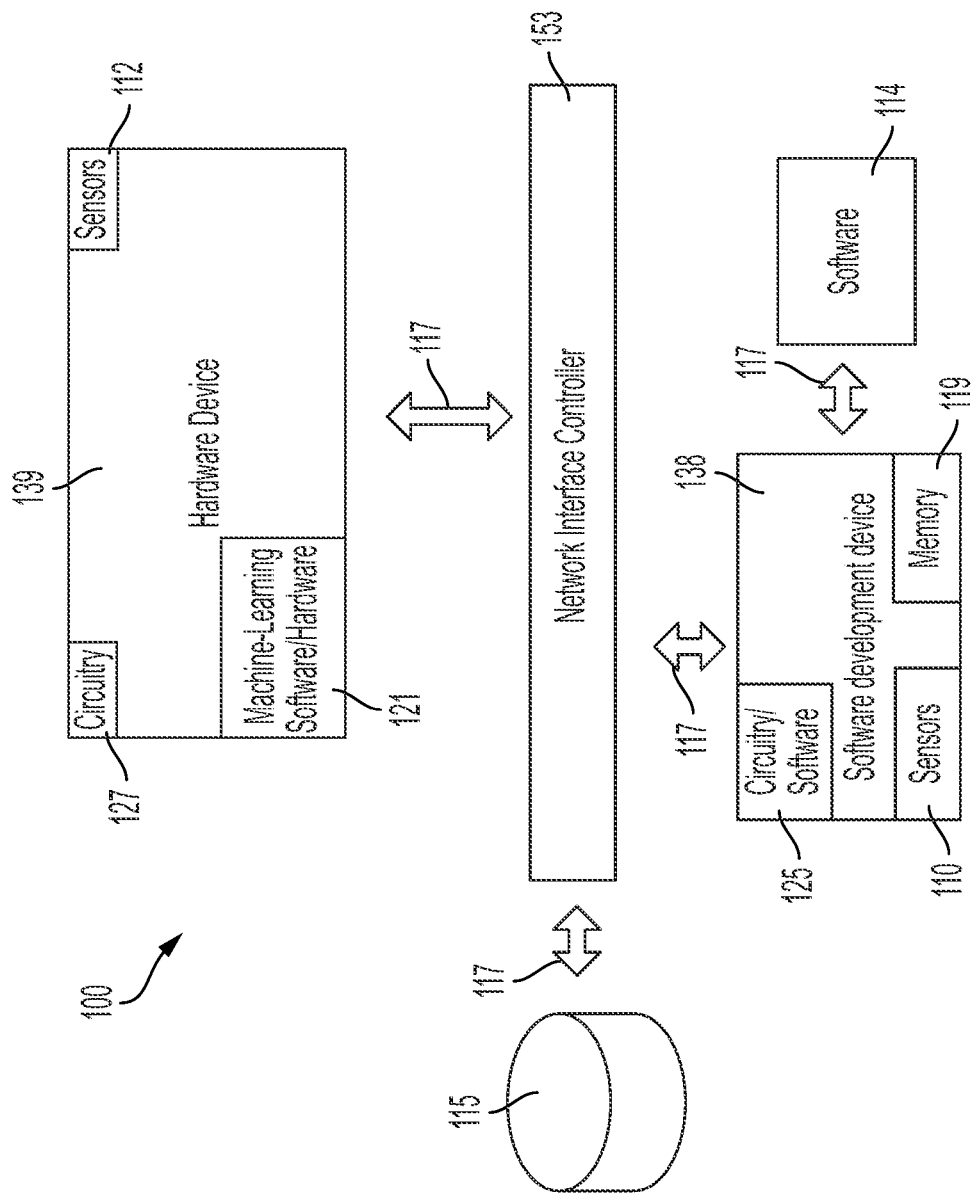
FIG. 1 illustrates a system for improving software technology associated with scanning source code for identifying missing hardware and software parameters, determining an associated automation parameter for automated software generation, and executing corrective actions for generating associated software, in accordance with embodiments of the present invention.

FIG. 1 illustrates a system 100 for improving software technology associated with scanning source code for identifying missing hardware and software parameters, determining an associated automation parameter for automated software generation, and executing corrective actions for generating associated software, in accordance with embodiments of the present invention. During typical Web and mobile application production, testing and associated automation is an integral part of a software development lifecycle irrespective of a software development methodology adopted. Likewise, during a typical test automation process, a test automation engineer may prepare test scripts based on a user interface (UI) design and layout structure. Subsequently, when a test automation engineer identifies missing UI element attributes (e.g., labels, images, drop down lists, URL links, etc.), developers may be required to update UI code with missing attributes, re-build the UI code, and deliver the rebuilt UI code to a test automation team. This aforementioned UI code rebuilding process may require multiple iterations in order for test automation engineers to locate all object attributes required for test automation. Additionally, when test entities identify objects that do not include required properties or values, developers are required to update code by populating required properties and sharing new build test code for automation thereby creating delays and extended test cycles. Likewise, a process for identifying UI Elements (e.g., corresponding values and object properties) within a user interface being tested typically comprises a manual and time consuming process requiring repetitive processes performed by a development and testing team. Typical software development processes do not include automated means for identifying (and generating alerts associated with) missing object attributes during code development. Like, software development processes do not typically include a process for identifying a percentage of UI interface testing that may be automatable. Typical solutions provide an end to end framework for deriving an automation quotient (AQ) based on a manual and labor intensive process. Therefore, system 100 enables a process for automatically deriving an AQ for an application that identifies an automatability of a green field application, a maintenance and support application, and legacy applications.

System 100 provides a process for:
1. Calculating an AQ score for a user interface. The AQ score specifies how automatable a Web or mobile user interface may be.
2. Converting the data variables into bins comprising categorial data attributes.
3. Suggesting an action execution framework to enhance an AQ with respect to all hardware and software parameters.

System 100 of FIG. 1 includes a hardware device 139 (i.e., specialized hardware), a software development device 138, software 114, a database 115, and a network interface controller 153 interconnected through a network 117. Hardware device 139 includes specialized circuitry 127 (that may include specialized software), sensors 112, and machine learning software code/hardware structure 121 (i.e., including machine learning software code). Network interface controller 153 may include any type of device or apparatus for securely interfacing hardware and software to a network. Software development device 138 comprises any type of hardware or software device associated with communications with hardware device 139 for automatically generating software 114. Software development device 138 includes specialized circuitry 125 (that may include specialized software), memory 119, and sensors 110. Sensors 110 and 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Hardware device 139 and software development device 138 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139 and software development device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with scanning source code for identifying missing hardware and software parameters, determining an associated automation parameter for automated software generation, and executing corrective actions for generating associated software. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for generating a corrective action associated with automated software development by: generating an AQ score of system 100, converting associated data variables into configurable digital bins, and generating and applying the corrective actions for automated software development.

An AQ score is generated with respect to the following input parameters: UI elements and attributes, channel compatibility, application type, and unit test coverage. A resulting output parameter includes an AQ Score. Code executed for generating the AQ score includes multinomial logistic regression model and stochastic gradient process code, Bayesian model code, and clustering code for generating an entropy model configured to identify clusters mapped to configurable digital bins.

Converting associated data variables into configurable digital bins converting the aforementioned input parameters into digital bins based on executable actions with respect to previous digital data within similar configurable projects.

Generating and applying the corrective actions for automated software development includes the following steps:
1. Scans each UI page.
2. Accessed the UI page with respect to a scale of all parameters used for deriving the AQ.
3. Scanned code for insight and corrective actions.
4. Altering constraint values within an equation and measuring a variance within a corresponding AQ score. A corrective action is generated based on variance analysis of the score within each parameter.
5. An AQ is listed within a database. Resulting AI and analytics are applied to enable a self-learning system and based on a matrix of an AQ score and corresponding parameters, a list of corrective actions is framed.

Figure 2:
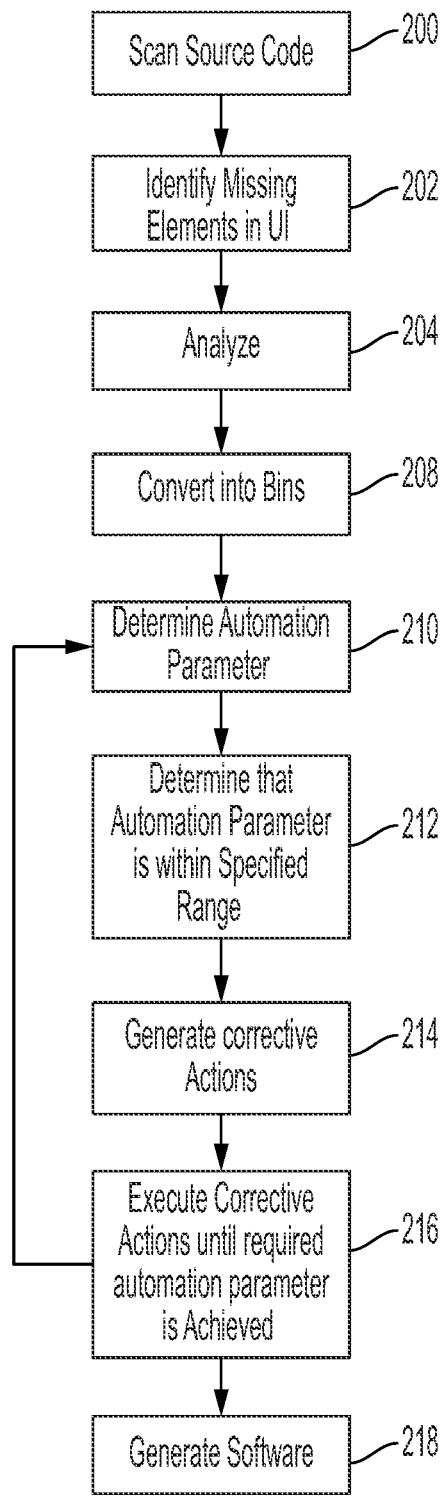
FIG. 2 illustrates an algorithm detailing a process flow enabled by the system of FIG. 1 for improving software technology associated with scanning source code for identifying missing hardware and software parameters, determining an associated automation parameter for automated software generation, and executing corrective actions for generating associated software, in accordance with embodiments of the present invention.

FIG. 2 illustrates an algorithm detailing a process flow enabled by system 100 of FIG. 1 for improving software technology associated with scanning source code for identifying missing hardware and software parameters, determining an associated automation parameter for automated software generation, and executing corrective actions for generating associated software, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139 and software development device 138. In step 200, source code is canned by a hardware device. In step 202, missing elements of hardware and software parameters (within a user interface) are identified in response to the scanning of step 200. The missing elements of hardware and software parameters are associated with functional operation of software for development. The hardware and software parameters may include, inter alia, user interface element and attribute parameters, communication channel capability parameters, software application type parameters, hardware and software testing capability parameters, etc.

In step 204, the hardware and software parameters are analyzed. In step 208, the hardware and software parameters are converted into configurable digital bins. The conversion process may be executed based on industrial hardware and software actions, associated project data, and system variance analysis.

In step 210, an automation parameter is determined based on the analysis of step 204. The automation parameter is associated with portions of the software configured for automatic development and generation. Determining the automation parameter may include executing multinomial logistic regression model and stochastic gradient process code or Bayesian model code with respect to results of step 204. Alternatively, determining the automation parameter may include executing clustering code with respect to said results of step 204 and generating an entropy model configured to identify clusters mapped to the configurable digital bins. In step 212, it is determined that the automation parameter is within a specified range of the portions of the software.

In step 214, corrective actions associated with automating development of the software are generated based on results of step 208 with respect to the automation parameter. Generating the corrective actions may include:
1. Scanning user interface pages associated with the hardware and software parameters.
2. Accessing the user interface pages.
3. Scanning associated software code for attributes of the corrective actions.
4. Altering associated constraint values associated with the corrective actions.
5. Applying artificial intelligence code to the automation parameter.

In step 216, the corrective actions are executed with respect to development of the software. The corrective actions are executed (and steps 210-216 are repeated) until a required automation parameter range is achieved. In step 218, the software is generated in response to executing the corrective actions. Additionally, self-learning software code configured to execute future instances of automated software application generation may be generated.

Figure 3:
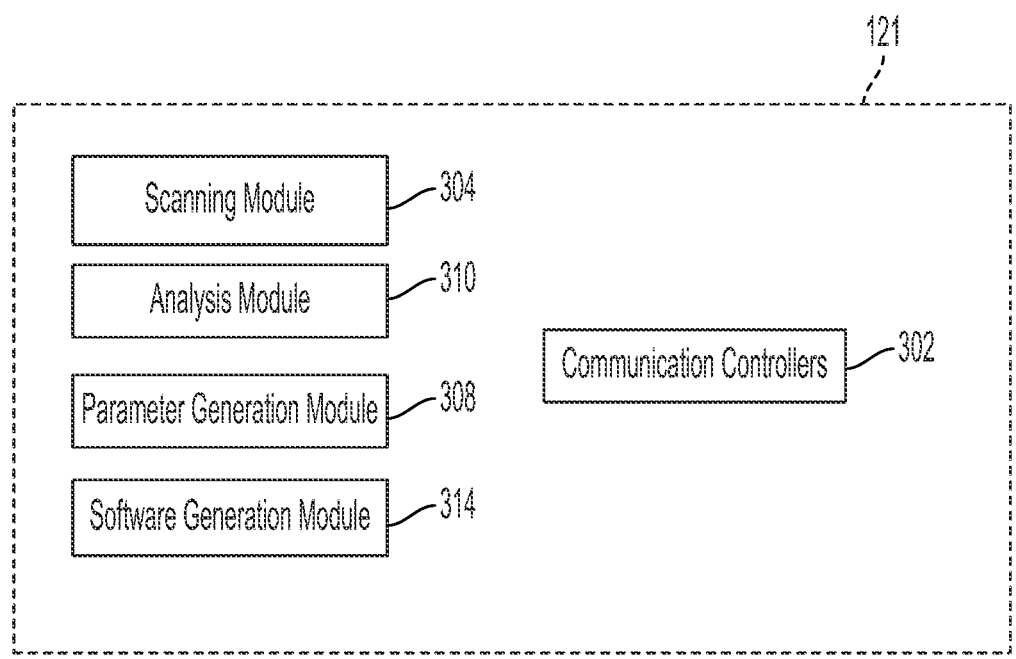
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry 127 and circuitry/software 125) of FIG. 1, in accordance with embodiments of the present invention. Machine learning software/hardware structure 121 includes a scanning module 304, an analysis module 310, a parameter generation module 308, a software generation module 314, and communication controllers 302. Scanning module 304 comprises specialized hardware and software for controlling all functions related to the scanning and identification steps of FIGS. 1 and 2. Analysis module 310 comprises specialized hardware and software for controlling all functionality related to the analysis and conversion steps of FIG. 2. Parameter generation module 308 comprises specialized hardware and software for controlling all functions related to generating automation parameters and generating corrective actions as described with respect to the algorithm of FIG. 2. Software generation module 314 comprises specialized hardware and software for controlling all functions related to generating software as described with respect to the algorithm of FIG. 2. Communication controllers 302 are enabled for controlling all communications between scanning module 304, analysis module 310, parameter generation module 308, and software generation module 314.

Figure 4:
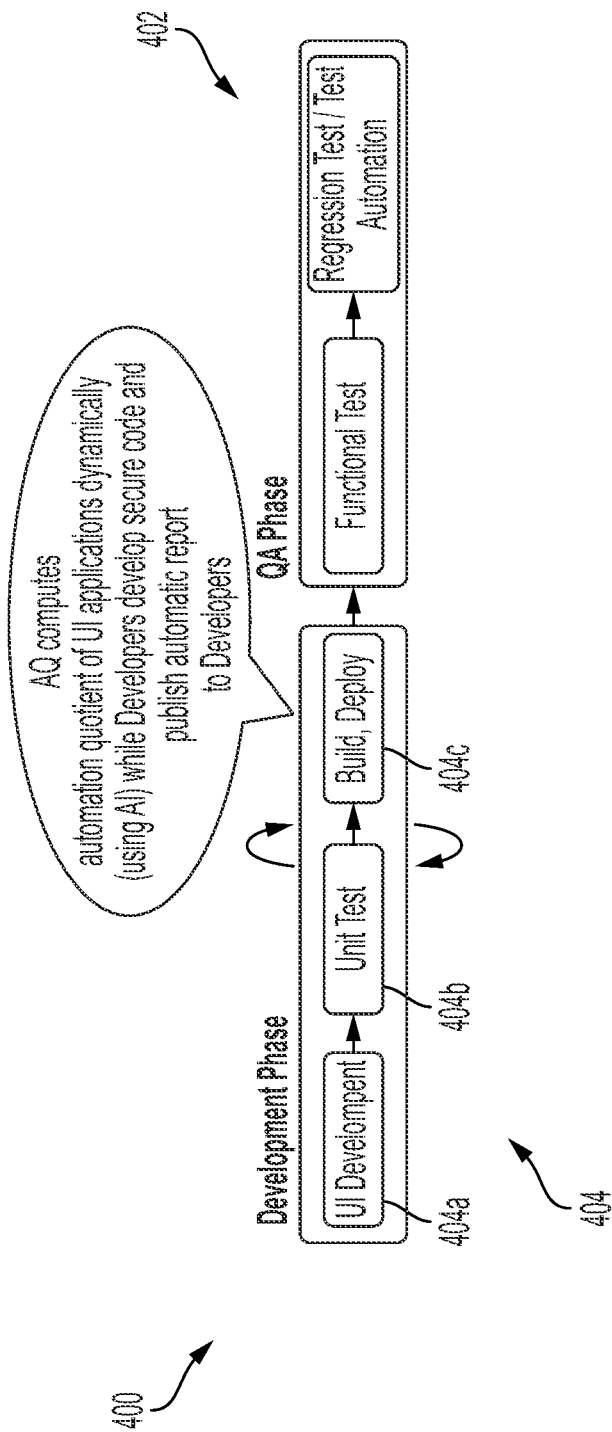
FIG. 4 illustrates an automation parameter development software/hardware system, in accordance with embodiments of the present invention.

FIG. 4 illustrates an automation parameter development software/hardware system 400, in accordance with embodiments of the present invention. Typical systems are associated with applying artificial intelligence (AI) processes during a quality assurance (QA) phase 402 to repair errors within test automation scripts. In contrast automation parameter development software system 400 is configured to determine an automatability percentage of a software application for development and generate corrective actions for developers during a development phase executed via a development component 404. Therefore, automation parameter development software system 400 is configured to automatically enable a corrective actions framework after deriving an automation parameter. Likewise, automation parameter development software system 400 is configured to cognitively determine an automatability percentage of an application and generates and applies corrective actions during a development phase until a required AQ score is achieved thereby improving software development technology for enabling developers to execute corrective actions and apply AI code for improving an automatability percentage of an application during development phases and minimizing software build iterations between development and QA teams. Development component 404 comprises a user interface (UI) component 404a, a unit test component 404b, and a build/deploy component 404c. UI development component 404a is defined herein as a hardware/software component for developing a user interface (UI) of a software application. Automation parameter development software system 400 enables the following process for automating software development and generation:
1. An AQ for automation parameter development software system 400 is generated.
2. Data variables are converted into digital bins.
3. Corrective actions are generated and applied to automation parameter development software system 400.

An AQ is generated with respect to differing parameters as illustrated in Table 1.

TABLE 1

| Notation | Data Attribute | Impacts with respect to AQ |
| --- | --- | --- |
| $x_1$ | UI elements and attributes | If all attributes of the UI elements are present, then AQ score is higher and vice versa. |
| $x_2$ | Channel compatibility | If a software application is developed for a specific |

TABLE 1-continued

| Notation | Data Attribute | Impacts with respect to AQ |
|---|---|---|
| | | device or a specific browser, then the AQ score is lower and vice versa. |
| $x_3$ | Application type | Legacy applications contain unsupported UI elements which are unable to be automated. |
| $x_4$ | Unit test coverage | An AQ score is directly proportional to the unit test coverage. |
| y | AQ Score | A generated final AQ score |

The following dataset is applied to the AQ generation process:

A number of UI elements and attributes are configured to determine how many attributes of the software are missing. For example, if a text box element is editable, then the element is automatable, and gaps and an associated pattern are identified. Likewise, if the element is non-editable then the element is non-automatable (e.g., checkboxes, text fields, radio boxes, drop down lists, zoom controls, etc.). The aforementioned process may be configured to verify if an embedded URL is not populated based on a determination that an associated image is not embedded. Likewise, a length and width of a Web page/mobile app screen size may be modified if a Webpage is scrollable vertically and horizontally or upwards and downwards. If a Webpage is scrollable, it increases an automation complexity with respect to object availability and identifiability (e.g., multiple/complex object locater code is necessary). Additionally, an associated channel compatibility may be modified based on a design (e.g., responsive or non-responsive), a device (e.g., mobile device, laptop computer, tablet computer, desktop computer, etc.), a Web browser, etc. The aforementioned channel compatibility impacts AQ generation such that if an application is developed for the laptop (but not for a mobile device), then the application running on a mobile device will reduce an AQ score. Therefore, if the application is detected as not responsive or the application is run within different devices, the AQ score will additionally be reduced. An AQ score may be impacted by a legacy (i.e., outdated or obsolete) application as the legacy application may include unsupported UI elements that are unable to be automated. Likewise, if the application is cloud enabled, it may include APIs that are integrated with current automation associated UI technologies thereby improving an overall AQ score.

Applications may require testing based on detection of a total number of lines of code in the application or a total number of lines of code covered by unit test coverage. A unit test coverage percentage=(a total number of lines of code covered by unit test coverage/a total number of lines of code in the application). If the unit test coverage is increasing, the AQ score will increase and vice versa. A code-based algorithm for determining an AQ score is as follows:

Given a training Set X; $\vec{x}$ represents a set of measurement features $\{x_1 x_2 x_3 \cdot x_d \ldots\}$ in a space $R^D$, where:
$x_1$=UI elements and attributes.
$x_2$=Channel compatibility.
$x_3$=Application type.
$x_4$=Unit test coverage
y=Response variable (i.e., AQ)

Associated vectors may include continuous vectors, discrete vectors, nominal vectors, or categorical variable vectors. An output/response variable Y is discrete and may be converted to encoded values or categorical numbers. Initially, log likelihood principal code and Bayesian discriminant analysis code is executed to predict a range leveraging the following multinomial logistic regression model:

$p(y|x,\theta)=N(y|f(x), \sigma^2)=$
$> x \in R^d, y \in R$ and $y=f(x)+\varepsilon$, where $\varepsilon=N(0, \sigma^2)$
$p(y|x,\theta)=N(y|x,\theta, \sigma^2)$, where x is a vector of random variables
$p(y|x)$ is associated with a likelihood of a probability that a density function of y at $x^T$ is $y=x^T\theta+\varepsilon$. Alternatively, $y_i=\theta_0+\theta_1 x_1+\theta_2 x_2+\theta_3 x_3+\ldots e_i$
$p(y|x, \theta)=N(y|x, \theta,\sigma^2)$ A log of both sides of the aforementioned multinomial logistic regression model is as follows:

$$-\log P\left(\left(y \mid \vec{x}, \vec{\theta}\right)\right)\ldots = -\log \prod_{n=1}^{N} P(y_n \mid x_n \theta); n \text{ is observation vector}$$

$$= > -\log P\left(y \mid \vec{x}, \vec{\theta}\right) = -\sum_{n}^{N} \log P(y_n \mid x_n, \theta)\setminus$$

$$= > L(\theta) = -\log P\left(y \mid \vec{x}, \vec{\theta}\right) = -\log\left(\frac{1}{\sqrt{2\pi\sigma^2}} * e^{\frac{(y-x^T\theta)^2}{2*\sigma^2}}\right)$$

$$= > L(\theta) = -\frac{1}{2\sigma^2}(y_n - x_n^T\theta)^2 + \sum_{n=1}^{N} \log\left(1 / \left(\sqrt{2*\pi\sigma^2}\right)\right)$$

Based of the aforementioned log process, a gradient vector is generated for evaluating a loss function as a function comprising differing weight vectors for determining a best weight for which ($L(\theta)$ is minimized. The gradient vector is generated based on a batch gradient process as follows:
A vector $$\vec{\theta} = \begin{bmatrix} \theta_1 \\ \theta_N \end{bmatrix}$$

represents a parametric vector as weights for each measurement vector and an iteration=0 is set and initial parameters are enabled for a learning rate ($\eta$) and epsilon. Likewise, gradient vector $\nabla L(\vec{\theta})$ is generated and such that $\nabla L(\vec{\theta})$ >Epsilon:

$$\overrightarrow{\theta_{N+1}} = \vec{\theta}_N - \eta \sum_{i=1}^{N} \left\{\nabla L(\vec{\theta})^T\right\},$$

where N represents training measurements over X,Y. Additionally, N=N+1 and $\theta \rightarrow$ {Optimized value} is returned.

The gradient vector is generated based on a stochiastic gradient process as follows:
A vector $$\vec{\theta} = \begin{bmatrix} \theta_1 \\ \theta_N \end{bmatrix}$$

represents a parametric vector comprising weights for each measurement vector. Likewise, an iteration=0 is set with respect to initial parameters for a learning rate ($\eta$) and epsilon. Likewise, $\nabla L(\vec{\theta})$ is generated such that $\nabla L(\vec{\theta})$> Epsilon as follows:

A random point x over training set X is located such that $\vec{\theta}_{N-1} = \vec{\theta}_N - \eta * \nabla L(\vec{\theta})$ with respect to a random point x generated as N=N+1. Additionally, N=N+1 and $\theta \rightarrow$ {Optimized value} is returned.

The aforementioned process results in generation of a logistic/multi logistic model to categorize AQ scores with respect to categories 1, 2, 3, 4 comprising bin values associated with the aforementioned AQ score.

Linear Discriminant Analysis code may be executed with respect to Bayesian theory as follows:

$$p(y_1 | \vec{x}) \sim N(\mu_{y_1|x}, *\Sigma_{y_1|\vec{x}});$$

$$p(y_2 | y_1) = \left(2 * \pi * (1 - \rho^2)^{-\frac{1}{2}} * e^{-1/2\left(y_2 - \mu_2 - \rho * \frac{\sigma_2 * (y_2 - \mu_2)^2}{\sigma_1}\right)}\right.$$

$\mu_{y_1|x}$, −Mean of $\vec{x}$ for class belonging to this $AQ$ Bin

An associated design stage is configured to execute unsupervised machine learning technique code to enable a k clustering or hierarchical clustering process for generating an entropy model to identify clusters mapped to an AQ score bin as follows:

X comprises a set of measurement vectors $\{x_1 x_2 x_3 \ldots x_n\}$ with respect to random centroids from observations within space $R^D$. For example, if an application requires 3 centroids in $R^D$, then a loss function is generated based on an L2 distance as follows:

$$L(\theta) = \frac{1}{2} * \left((\vec{x} - \vec{w})^2\right),$$

where $\vec{x}$ is vector and $\vec{w}$ is the weight vector of centroid. Likewise, a Jacobian matrix is generated for optimizing centroids such that the weights remain unchanged as follows: $\Delta \omega = -\epsilon \, dL(x,w)/dw$. Therefore, to centroids are converged to obtain associated clusters. Subsequently, probability code is executed with respect to an entropy function to calculate an accuracy of an AQ test score for K clustering thereby enabling generation of project code with a low AQ score using an entropy function.

Data variables are converted into digital bins based on a range with respect to specified action recommendations and associated previous history with respect to a variance analysis. The range is configurable with respect to UI elements and attributes as illustrated in Tables 2-5.

TABLE 2

UI elements and attributes

| Notation | Data Attribute | Range | Status Color |
|---|---|---|---|
| $x_1$ | UI elements and attributes | 0-25% | Red |
| | | 26-50% | Orange |
| | | 51-75% | Yellow |
| | | 76-100% | Green |

TABLE 3

Channel compatibility

| Notation | Data Attribute | Range | Status Color |
|---|---|---|---|
| $x_2$ | Channel compatibility | 0-25% | Red |
| | | 26-50% | Orange |
| | | 51-75% | Yellow |
| | | 76-100% | Green |

TABLE 4

Application type

| Notation | Data Attribute | Range | Status Color |
|---|---|---|---|
| $x_3$ | Application type | 0-25% | Red |
| | | 26-50% | Orange |
| | | 51-75% | Yellow |
| | | 76-100% | Green |

TABLE 5

Unit test coverage

| Notation | Data Attribute | Range | Status Color |
|---|---|---|---|
| $x_4$ | Unit test coverage | 0-25% | Red |
| | | 26-50% | Orange |
| | | 51-75% | Yellow |
| | | 76-100% | Green |

Corrective actions are generated for application to automation parameter development software system 400 as follows:

1. A screen scanner software/hardware tool scans each UI page (i.e., for a UI associated with a software design and layout structure).
2. The UI page is accessed with respect to a scale of all hardware/software parameters associated with deriving an AQ.
3. Associated code is scanned for insight and associated actions.
4. Variance code is executed for application by altering constraint values within an associated equation and measuring a variance within a corresponding AQ score. An associated action is generated based on a variance analysis of a score within each hardware/software parameter.
5. An AQ calculation associated with historical (similar) project data is stored within a specialized database. All associated AI and analytics are applied to enable a self-learning hardware/software system. Based on a matrix of AQ score variables and corresponding hardware/software parameters, a list of actions is presented. The following process describes an example of an action generation process:

The process is initiated when it is determined that a software application is supported by a first Web browser (type) and a second Web browser (type) but it is not supported by a third Web browser (type). Support for the third Web browser may be enabled by updating an associated meta tag. Therefore, Websites comprising an x-ua-compatible meta tag or HTTP header set to "IE=edge" may enable support for the third Web browser with respect to an earlier version. Likewise, the software application is supported in laptop, desktop, and tablet device mode but not in a mobile device mode. Therefore, system 400 is enabled to add meta name="viewport" content="width=device-width, initial-scale=1, maximum-scale=1, user-scalable=no" for generating an action for achieving compatibility. Additionally, media queries may be added to cascading style sheets (CSS). An associated list box may not be editable. Therefore, when the associated action enables the associated list box to be, an associated AQ score is enhanced. Likewise, if an image is determined to be missing from an src/image folder, an associated AQ score is enhanced when the image is placed within the src/image folder.

A software application may be categorized into a different color status based on an overall AQ score as illustrated in table 6.

TABLE 6

Analyze an AQ score.

| AQ Range | Status | Tab Name in the attached excel sheet |
|---|---|---|
| 0-30% | Red | AQ Recommendation-Red |
| 31-55% | Orange | AQ Recommendation-Orange |
| 56-80% | Yellow | AQ Recommendation-Yellow |
| 81-100% | Green | Not Applicable |

A resulting action may be generated based on code analysis execution with respect to a need for correction. The action is further generated based on a two-dimensional matrix of input, a current state, and a corresponding output state. A resulting action recommendation sheet provides an optimal path for software/hardware fixes thereby increasing an AQ score within a green bin.

Figure 5:
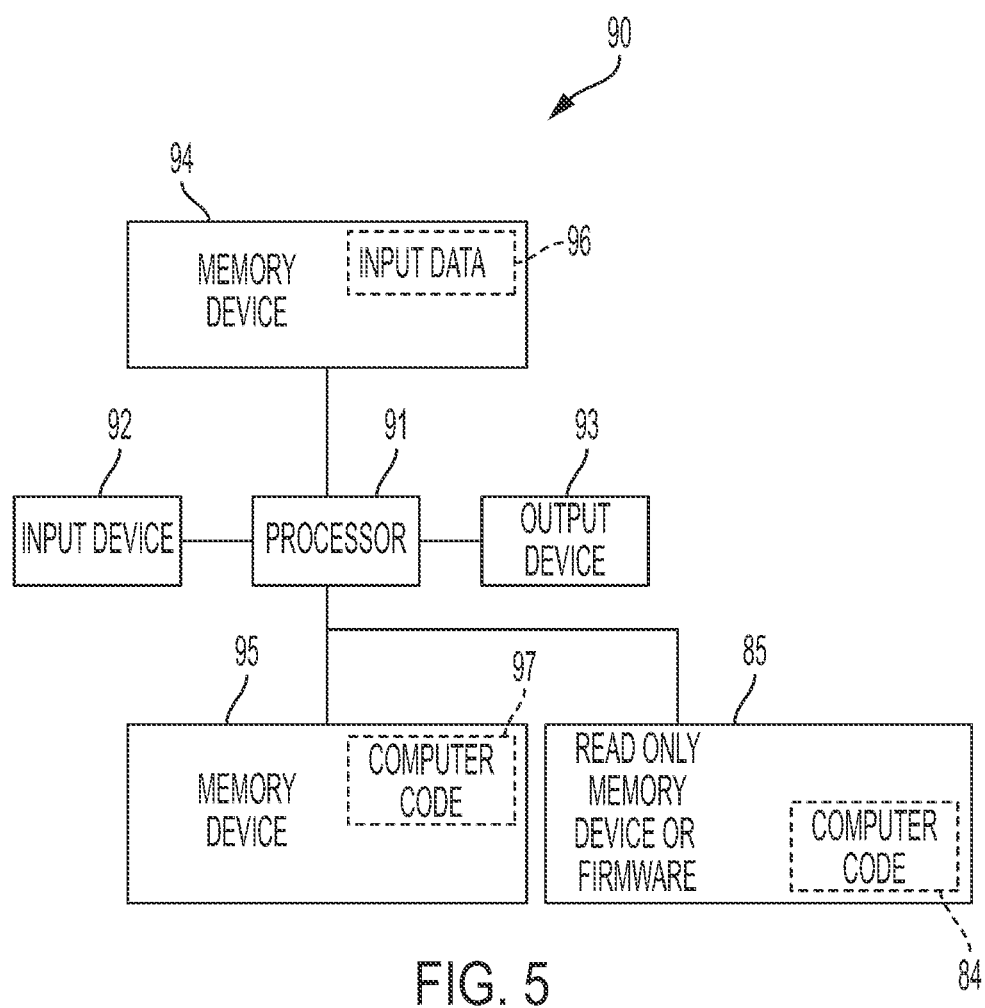
FIG. 5 illustrates a computer system used by the system of FIG. 1 for improving software technology associated with scanning source code for identifying missing hardware and software parameters, determining an associated automation parameter for automated software generation, and executing corrective actions for generating associated software, in accordance with embodiments of the present invention.

FIG. 5 illustrates a computer system 90 (e.g., hardware device 139 and software development device 138 of FIG. 1) used by or comprised by the system of FIG. 1 for improving software technology associated with scanning source code for identifying missing hardware and software parameters, determining an associated automation parameter for automated software generation, and executing corrective actions for generating associated software, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software technology associated with scanning source code for identifying missing hardware and software parameters, determining an associated automation parameter for automated software generation, and executing corrective actions for generating associated software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with scanning source code for identifying missing hardware and software parameters, determining an associated automation parameter for automated software generation, and executing corrective actions for generating associated software. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with scanning source code for identifying missing hardware and software parameters, determining an associated automation parameter for automated software generation, and executing corrective actions for generating associated software. In another embodiment, the invention provides a business method that performs the process steps of the invention on a subscription, advertising, and/or fee basis. That is, a service supplier, such as a Solution Integrator, could offer to enable a process for improving software technology associated with scanning source code for identifying missing hardware and software parameters, determining an associated automation parameter for automated software generation, and executing corrective actions for generating associated software. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
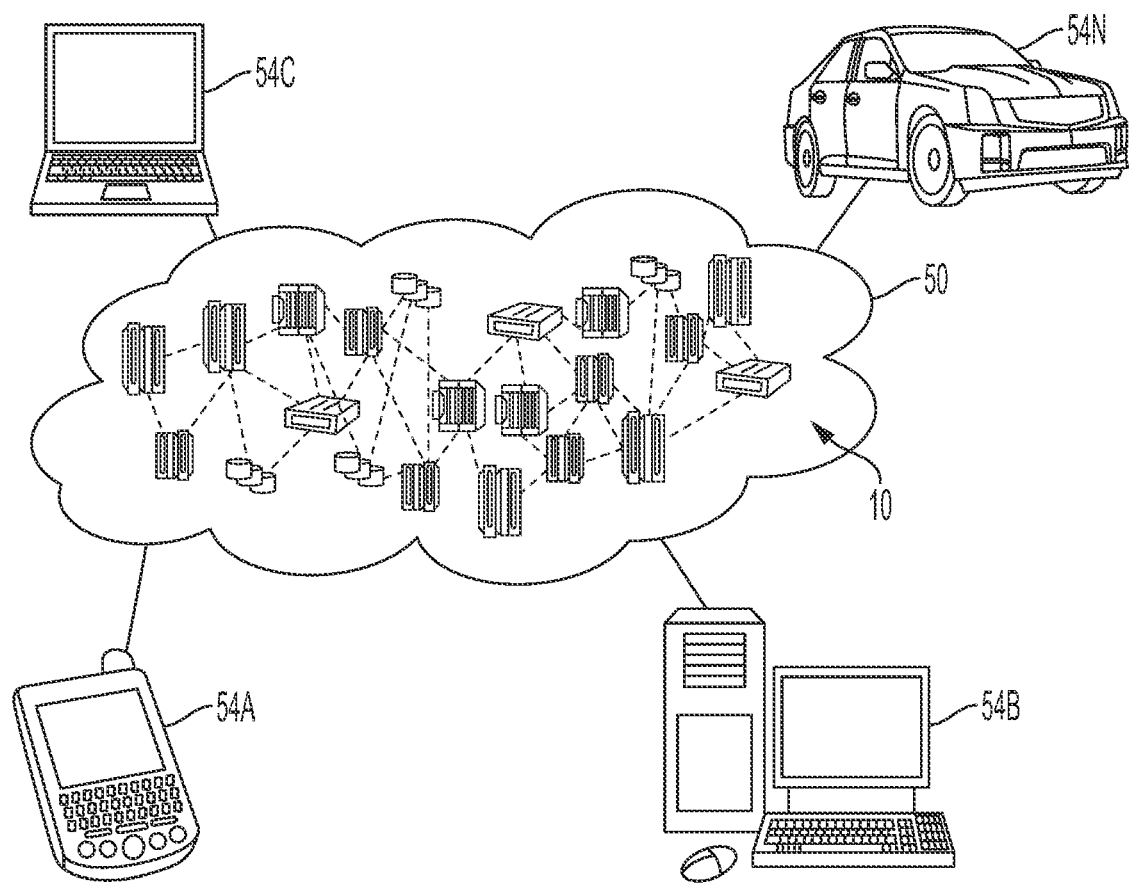
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
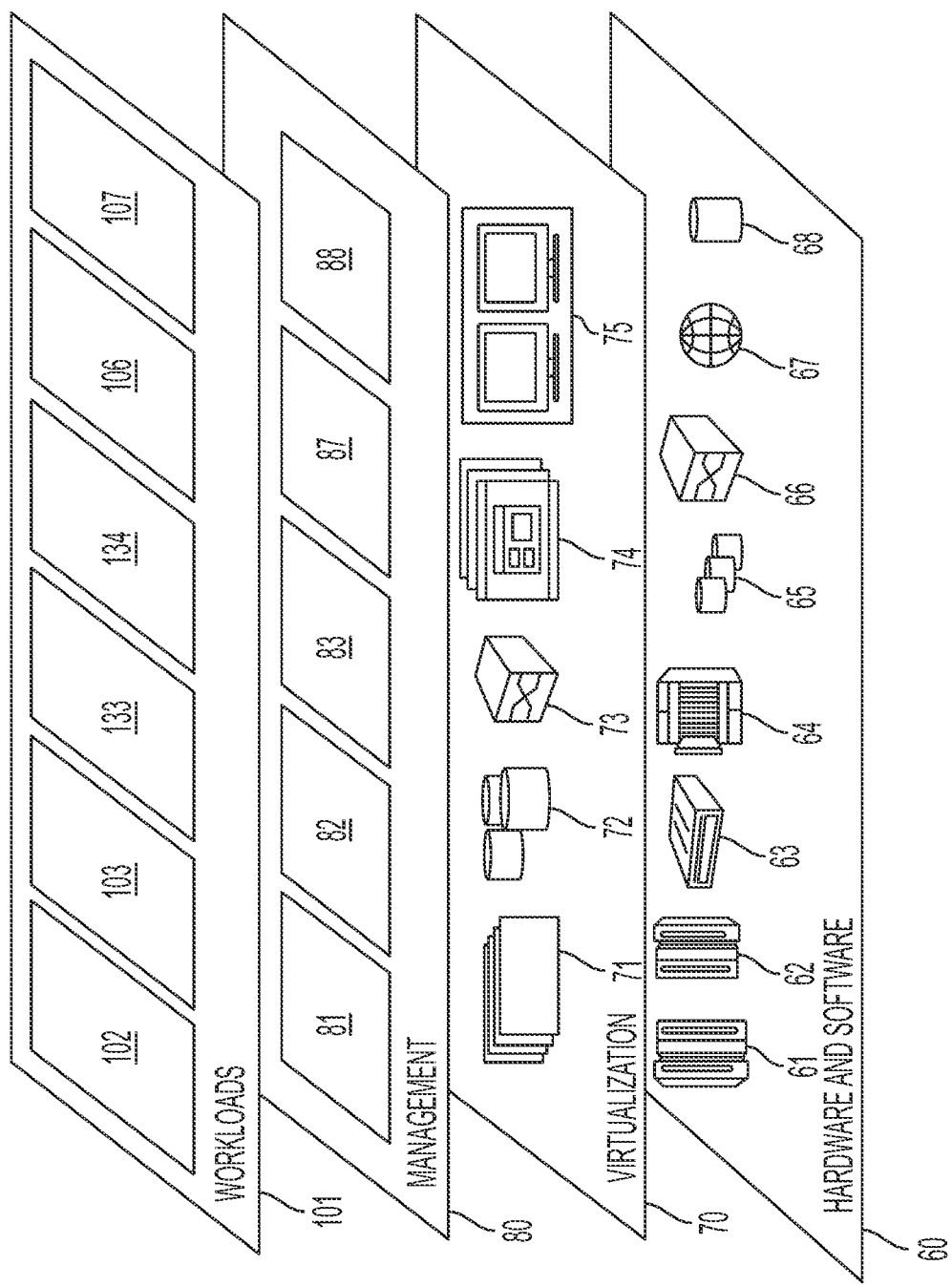
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software technology associated with scanning source code for identifying missing hardware and software parameters, determining an associated automation parameter for automated software generation, and executing corrective actions for generating associated software 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated software application generation method comprising:
   scanning, by a processor of a hardware device, source code;
   identifying, by said processor in response to results of said scanning, missing elements of hardware and software parameters associated with functional operation of software for development;
   analyzing, by said processor, said hardware and software parameters;
   converting, by said processor, said hardware and software parameters into a plurality of configurable digital bins;
   determining, by said processor in response to results of said analyzing, an automation parameter associated with portions of said software configured for automatic development and generation;
   generating, by said processor based on results of said converting with respect to said automation parameter, corrective actions associated with automating development of said software;
   additionally determining, by said processor, that said automation parameter is within a specified range of said portions;
   executing, by said processor in response to results of said additionally determining, said corrective actions with respect to said development of said software; and
   automatically generating, by said processor in response to said executing, said software.

2. The method of claim 1, wherein said hardware and software parameters comprise operational parameters selected from the group consisting of user interface elements and attributes, communication channel capability, software application type, and hardware and software testing capability.

3. The method of claim 1, wherein said determining said automation parameter comprises executing multinomial logistic regression model and stochastic gradient process code with respect to said results of said analyzing said hardware and software parameters.

4. The method of claim 1, wherein said determining said automation parameter comprises executing Bayesian model code with respect to said results of said analyzing said hardware and software parameters.

5. The method of claim 1, wherein said determining said automation parameter comprises:
   executing clustering code with respect to said results of said analyzing said hardware and software parameters; and
   generating an entropy model configured to identify clusters mapped to said configurable digital bins.

6. The method of claim 1, wherein said converting is executed based on industrial hardware and software actions, associated project data, and system variance analysis.

7. The method of claim 1, wherein said generating said corrective actions comprises:
   scanning user interface pages associated with said hardware and software parameters;
   accessing said user interface pages;
   scanning associated software code for attributes of said corrective actions;
   altering associated constraint values associated with said corrective actions; and
   applying artificial intelligence code to said automation parameter.

8. The method of claim 1, further comprising:
   generating, by said processor, self-learning software code configured to execute future instances of said automated software application generation.

9. The method of claim 1, further comprising:
   providing at least one support service for at least one of creating, integrating, hosting, maintaining, and deploying computer-readable code in the hardware device, said code being executed by the computer processor to implement: said scanning, said analyzing, said converting, said determining, said additionally determining, said executing, and said automatically generating.

10. A computer program product, comprising a computer readable hardware storage device storing a computer readable program code, said computer readable program code comprising an algorithm that when executed by a processor of a hardware device implements an automated software application generation method, said method comprising:
    scanning, by said processor, source code;
    identifying, by said processor in response to results of said scanning, missing elements of hardware and software parameters associated with functional operation of software for development;
    analyzing, by said processor, said hardware and software parameters;

converting, by said processor, said hardware and software parameters into a plurality of configurable digital bins;

determining, by said processor in response to results of said analyzing, an automation parameter associated with portions of said software configured for automatic development and generation;

generating, by said processor based on results of said converting with respect to said automation parameter, corrective actions associated with automating development of said software;

additionally determining, by said processor, that said automation parameter is within a specified range of said portions;

executing, by said processor in response to results of said additionally determining, said corrective actions with respect to said development of said software; and automatically generating, by said processor in response to said executing, said software.

11. The computer program product of claim 10, wherein said hardware and software parameters comprise operational parameters selected from the group consisting of user interface elements and attributes, communication channel capability, software application type, and hardware and software testing capability.

12. The computer program product of claim 10 wherein said determining said automation parameter comprises executing multinomial logistic regression model and stochastic gradient process code with respect to said results of said analyzing said hardware and software parameters.

13. The computer program product of claim 10 wherein said determining said automation parameter comprises executing Bayesian model code with respect to said results of said analyzing said hardware and software parameters.

14. The computer program product of claim 10 wherein said determining said automation parameter comprises:
   executing clustering code with respect to said results of said analyzing said hardware and software parameters; and
   generating an entropy model configured to identify clusters mapped to said configurable digital bins.

15. The computer program product of claim 10, wherein said converting is executed based on industrial hardware and software actions, associated project data, and system variance analysis.

16. The computer program product of claim 10, wherein said generating said corrective actions comprises:
   scanning user interface pages associated with said hardware and software parameters;
   accessing said user interface pages;
   scanning associated software code for attributes of said corrective actions;
   altering associated constraint values associated with said corrective actions; and
   applying artificial intelligence code to said automation parameter.

17. The computer program product of claim 10, wherein said method further comprises:
   generating, by said processor, self-learning software code configured to execute future instances of said automated software application generation.

18. A server hardware device comprising a processor coupled to a computer-readable memory unit, said memory unit comprising instructions that when executed by the processor implements an automated software application generation method comprising:
   scanning, by said processor, source code;
   identifying, by said processor in response to results of said scanning, missing elements of hardware and software parameters associated with functional operation of software for development;
   analyzing, by said processor, said hardware and software parameters;
   converting, by said processor, said hardware and software parameters into a plurality of configurable digital bins;
   determining, by said processor in response to results of said analyzing, an automation parameter associated with portions of said software configured for automatic development and generation;
   generating, by said processor based on results of said converting with respect to said automation parameter, corrective actions associated with automating development of said software;
   additionally determining, by said processor, that said automation parameter is within a specified range of said portions;
   executing, by said processor in response to results of said additionally determining, said corrective actions with respect to said development of said software; and
   automatically generating, by said processor in response to said executing, said software.

19. The server hardware device of claim 18, wherein said hardware and software parameters comprise operational parameters selected from the group consisting of user interface elements and attributes, communication channel capability, software application type, and hardware and software testing capability.

20. The server hardware device of claim 18, wherein said determining said automation parameter comprises executing multinomial logistic regression model and stochastic gradient process code with respect to said results of said analyzing said hardware and software parameters.

* * * * *